(12) United States Patent
Maruyama et al.

(10) Patent No.: US 12,472,601 B2
(45) Date of Patent: Nov. 18, 2025

(54) METHOD OF CHECKING LEAKAGE OF FLUID AND POLISHING APPARATUS

(71) Applicant: Ebara Corporation, Tokyo (JP)

(72) Inventors: Toru Maruyama, Tokyo (JP); Yasuyuki Motoshima, Tokyo (JP); Shuji Uozumi, Tokyo (JP); Keisuke Kamiki, Tokyo (JP); Mitsunori Komatsu, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 1313 days.

(21) Appl. No.: 16/449,756

(22) Filed: Jun. 24, 2019

(65) Prior Publication Data

US 2019/0389030 A1    Dec. 26, 2019

(30) Foreign Application Priority Data

Jun. 25, 2018  (JP) .................... 2018-119667

(51) Int. Cl.
  *B24B 37/005*  (2012.01)
  *G01M 3/28*   (2006.01)
(52) U.S. Cl.
  CPC .......... *B24B 37/005* (2013.01); *G01M 3/2807* (2013.01)
(58) Field of Classification Search
  CPC .......... B24B 55/12; B24B 57/00; B24B 57/02; G01M 3/28; G01M 3/2807; G01M 3/2815; F17D 5/02

See application file for complete search history.

(56) References Cited

U.S. PATENT DOCUMENTS

| | | | | |
|---|---|---|---|---|
| 2,927,005 | A | * | 3/1960 | O'Brien .............. G01M 3/3227 436/100 |
| 3,400,753 | A | * | 9/1968 | Slover ................. G21C 17/002 73/40.5 R |
| 5,226,471 | A | * | 7/1993 | Stefani ............... H05K 7/20281 165/200 |
| 5,795,995 | A | * | 8/1998 | Shimaoka ............ G01M 3/025 73/40 |

(Continued)

FOREIGN PATENT DOCUMENTS

| | | |
|---|---|---|
| JP | 2017-148933 A | 8/2017 |
| WO | WO8402978 A1 * | 8/1984 |

(Continued)

*Primary Examiner* — Joel D Crandall
(74) *Attorney, Agent, or Firm* — Venjuris, P.C.

(57) ABSTRACT

A method of checking a leakage of fluid from a fluid line includes connecting a leakage checking line to the fluid line between a supply valve and a return valve, regulating a pressure regulator disposed in the leakage checking line such that a pressure of fluid of the leakage checking line becomes the same as a pressure of fluid of the fluid line; closing the supply valve and the return valve and opening an opening/closing valve disposed in the leakage checking line; acquiring a flow rate of the fluid that flows in the leakage checking line by a flowmeter disposed in the leakage checking line; comparing the flow rate of the fluid acquired at the acquiring with a predetermined threshold; and determining that the fluid of the fluid line is leaked, when the flow rate of the fluid acquired at the acquiring is larger than the predetermined threshold.

7 Claims, 8 Drawing Sheets

(56) References Cited

U.S. PATENT DOCUMENTS

| | | | | |
|---|---|---|---|---|
| 6,125,876 | A | * 10/2000 | Laederich | ............... B24B 57/02 |
| | | | | 222/61 |
| 6,659,848 | B1 | * 12/2003 | Craig | ..................... B24B 37/04 |
| | | | | 451/60 |
| 2005/0072214 | A1 | * 4/2005 | Cooper | ............... G01M 3/2815 |
| | | | | 73/49.1 |
| 2013/0291974 | A1 | * 11/2013 | Bourgeois | ............... F17D 5/005 |
| | | | | 137/625.3 |

FOREIGN PATENT DOCUMENTS

| | | | | |
|---|---|---|---|---|
| WO | WO-2007026902 A1 | * | 3/2007 | ......... F16K 37/0091 |
| WO | WO-2014078398 A1 | * | 5/2014 | .......... B01F 15/0022 |
| WO | WO-2017185547 A1 | * | 11/2017 | ............... F17D 3/01 |

* cited by examiner

METHOD OF CHECKING LEAKAGE OF FLUID AND POLISHING APPARATUS

CROSS-REFERENCE TO RELATED APPLICATIONS

This application is based on and claims priority from Japanese Patent Application No. 2018-119667, filed on Jun. 25, 2018, with the Japan Patent Office, the disclosure of which is incorporated herein in its entirety by reference.

TECHNICAL FIELD

The present disclosure relates to a method of checking a leakage of fluid. Further, the present disclosure relates to a polishing apparatus provided with a system for checking a leakage of fluid.

BACKGROUND

A chemical mechanical polishing (CMP) apparatus is used for a process of polishing the surface of a wafer, in manufacturing a semiconductor device. The CMP apparatus holds and rotates a wafer with a polishing head, and presses the wafer to a polishing pad disposed on a rotating polishing table so as to polish the surface of the wafer. During the polishing, a polishing liquid (slurry) is supplied to the polishing pad, and the surface of the wafer is flattened by the chemical action of the polishing liquid and the mechanical action of the abrasive grains contained in the polishing liquid.

The polishing rate of the wafer relies on a surface temperature of the polishing pad as well as a polishing load of the wafer against the polishing pad. This is because the chemical action of the polishing liquid on the wafer relies on the temperature. Accordingly, in manufacturing a semiconductor device, in order to increase the polishing rate of the wafer and keep the polishing rate constant, it is important to maintain an optimal value of the surface temperature of the polishing pad during the polishing of the wafer.

Figure 9:
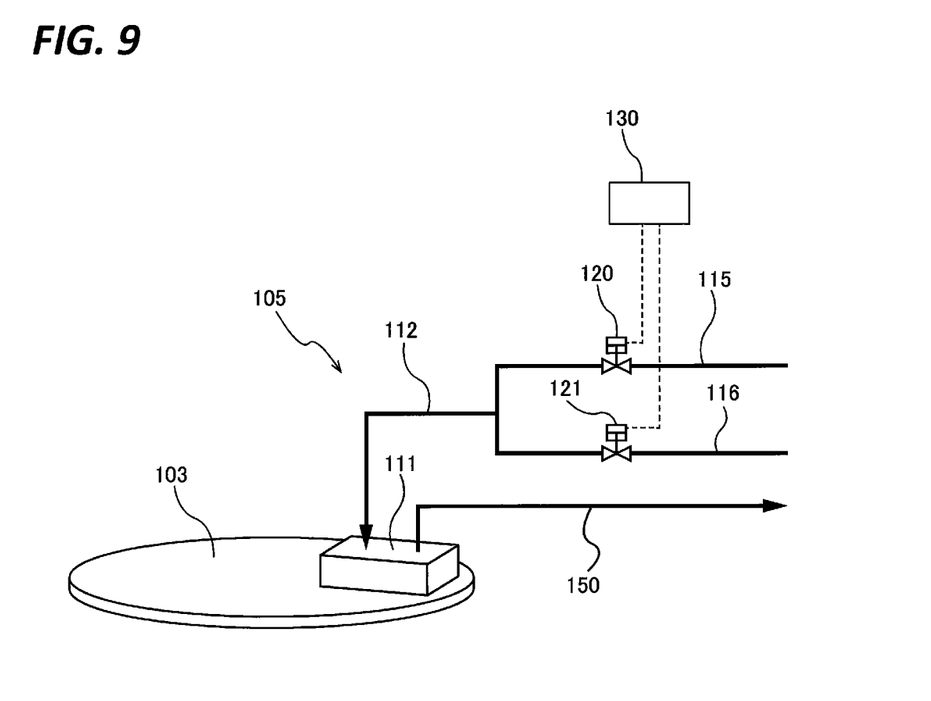
FIG. 9 is a schematic view illustrating an example of a pad temperature regulating device of related art.

Thus, in the related art, a pad temperature regulating device has been used to regulate the surface temperature of the polishing pad. FIG. 9 is a schematic view illustrating an example of the pad temperature regulating device of the related art. As illustrated in FIG. 9, the pad temperature regulating device includes a heat exchanger 111 that performs a heat exchange with a polishing pad 103, and a fluid line 105 in which the heat exchanger 111 is disposed. The fluid line 105 includes a fluid supply pipe 112 and a fluid discharge pipe 150, and the fluid supply pipe 112 is branched into a hot water supply pipe 115 that is connected to a hot water supply source and a cold water supply pipe 116 that is connected to a cold water supply source. A hot water regulation valve 120 and a cold water regulation valve 121 are provided in the hot water supply pipe 115 and the cold water supply pipe 116, respectively.

Hot water is supplied to the heat exchanger 111 through the hot water supply pipe 115 and the fluid supply pipe 112, flows in the heat exchanger 111, and then, is discharged from the heat exchanger 111 through the fluid discharge pipe 150. Cold water is supplied to the heat exchanger 111 through the cold water supply pipe 116 and the fluid supply pipe 112, flows in the heat exchanger 111, and then, is discharged from the heat exchanger 111 through the fluid discharge pipe 150.

The hot water regulation valve 120 and the cold water regulation valve 121 are flow rate control valves that are able to regulate the flow rates of the hot water and the cold water, respectively. When the hot water regulation valve 120 and the cold water regulation valve 121 change the flow rates of the hot water and the cold water, the temperature of the heat exchanger 111 is changed. A heat exchange is performed between the heat exchanger 111 and the polishing pad 103, and as a result, the surface temperature of the polishing pad 103 is changed.

A controller 130 controls the operations of the hot water regulation valve 120 and the cold water regulation valve 121. More specifically, the controller 130 determines operation amounts of the hot water regulation valve 120 and the cold water regulation valve 121 to minimize the difference between the surface temperature of the polishing pad 103 and a target temperature, and transmit the operation amounts to the hot water regulation valve 120 and the cold water regulation valve 121, respectively. The hot water regulation valve 120 and the cold water regulation valve 121 operate according to the operation amounts to regulate the flow rate of hot water and the flow rate of cold water. Reference is made to Japanese Laid-Open Patent Publication No. 2017-148933.

SUMMARY

When fluid is leaked from the fluid line 105 including the heat exchanger 111, the leaked fluid may be attached to the surface of the polishing pad 103. When the fluid leaked from the fluid line 105 is attached to the polishing pad 103 during the polishing of a wafer, the corresponding fluid may cause a deterioration of the polishing rate of the wafer and/or contaminants of the wafer. Since the leakage of the fluid from the fluid line 105 is an important issue in the polishing apparatus, it is necessary to periodically perform a leakage testing for checking whether a leakage of fluid is occurring from the fluid line 105.

However, when significant time is spent for the leakage testing, the throughput of the polishing apparatus is deteriorated. Thus, it is demanded to complete the leakage testing as quickly as possible. Further, the issue related to reducing the time spent for the leakage testing may occur in general apparatuses provided with a fluid line in which fluid flows, as well as a polishing apparatus provided with the pad temperature regulating device as illustrated in FIG. 9.

Thus, the present disclosure provides a method of checking a leakage of fluid from a fluid line in short time. Further, the present disclosure provides a polishing apparatus provided with a system capable of checking a leakage of fluid from a fluid line in short time.

An aspect of the present disclosure provides a method of checking a leakage of fluid from a fluid line in which a supply valve and a return valve are disposed. The method includes: connecting a leakage checking line to the fluid line between the supply valve and the return valve; regulating a pressure regulator disposed in the leakage checking line such that a pressure of fluid of the leakage checking line becomes the same as a pressure of fluid of the fluid line; closing the supply valve and the return valve and opening an opening/closing valve disposed in the leakage checking line; acquiring a flow rate of the fluid that flows in the leakage checking line by a flowmeter disposed in the leakage checking line; comparing the flow rate of the fluid acquired at the acquiring with a predetermined threshold; and determining that the fluid of the fluid line is leaked, when the flow rate of the fluid acquired at the acquiring is larger than the predetermined threshold.

In an aspect of the present disclosure, a heat exchanger is disposed in the fluid line, the supply valve is disposed on a primary side of the heat exchanger, and the return valve is disposed on a secondary side of the heat exchanger.

In an aspect of the present disclosure, the heat exchanger is disposed on a polishing pad of a polishing apparatus, a substrate is polished by being pressed to a surface of the polishing pad while a surface temperature of the polishing pad is regulated by supplying the fluid that flows in the fluid line to the heat exchanger, and the regulating, the closing, the acquiring, the comparing, and the determining are repeated each time the substrate is polished.

In an aspect of the present disclosure, an internal diameter of the leakage checking line is smaller than an internal diameter of the fluid line.

An aspect of the present disclosure provides a method of checking a leakage of fluid that flows in a fluid line in which a supply valve and a return valve are disposed. The method includes: disposing an intermediate valve in the fluid line between the supply valve and the return valve; connecting a leakage checking line to the fluid line such that the leakage checking line bypasses the intermediate valve; closing the intermediate valve and the return valve and opening an opening/closing valve disposed in the leakage checking line and the supply valve; acquiring a flow rate of fluid that flows in the leakage checking line by a flowmeter disposed in the leakage checking line; comparing the flow rate of the fluid acquired at the acquiring with a predetermined threshold; and determining that the fluid of the fluid line is leaked, when the flow rate of the fluid acquired at the acquiring is larger than the threshold.

In an aspect of the present disclosure, a heat exchanger is disposed in the fluid line, the supply valve and the intermediate valve are disposed on a primary side of the heat exchanger, and the return valve is disposed on a secondary side of the heat exchanger.

In an aspect of the present disclosure, the heat exchanger is disposed on a polishing pad of a polishing apparatus, a substrate is polished by being pressed to a surface of the polishing pad while a surface temperature of the polishing pad is regulated by supplying the fluid that flows in the fluid line to the heat exchanger, and the closing, the acquiring, the comparing, and the determining are repeated each time the substrate is polished.

In an aspect of the present disclosure, a regulator is disposed in the fluid line to regulate a pressure of the fluid that flows in the fluid line, and the intermediate valve and the leakage checking line are disposed on a secondary side of the regulator.

In an aspect of the present disclosure, an internal diameter of the leakage checking line is smaller than an internal diameter of the fluid line.

An aspect of the present disclosure provides a polishing apparatus including: a polishing table that supports a polishing pad; a polishing head that presses a substrate to a surface of the polishing pad to polish the substrate; a heat exchanger that is disposed on the polishing pad; and a leakage checking system that checks a leakage of fluid that flows in a fluid line in which a supply valve and a return valve are disposed. The heat exchanger is disposed in the fluid line, and the leakage checking system includes a leakage checking line that is connected to the fluid line between the supply valve and the return valve, an opening/closing valve, a flowmeter, and a pressure regulator that are disposed in the leakage checking line, and a controller that is connected to the opening/closing valve, the flowmeter, and the pressure regulator. The controller regulates the pressure regulator such that a pressure of fluid of the leakage checking line becomes the same as a pressure of fluid of the fluid line, closes the supply valve and the return valve and opens the opening/closing valve, acquires a flow rate of the fluid that flows in the leakage checking line by the flowmeter, compares the acquired flow rate of the fluid with a predetermined threshold, and determines that the fluid of the fluid line is leaked, when the acquired flow rate of the fluid is larger than the threshold.

In an aspect of the present disclosure, each time a substrate is polished by being pressed to a surface of the polishing pad while a surface temperature of the polishing pad is regulated by supplying the fluid that flows in the fluid line to the heat exchanger, the controller regulates the pressure regulator such that the pressure of the fluid of the leakage checking line becomes the same as the pressure of the fluid of the fluid line, closes the supply valve and the return valve and opens the opening/closing valve, acquires the flow rate of the fluid that flows in the leakage checking line by the flowmeter, compares the flow rate of the fluid acquired at the acquiring with the predetermined threshold, and determines that the fluid of the fluid line is leaked, when the flow rate of the fluid acquired at the acquiring is larger than the predetermined threshold.

In an aspect of the present disclosure, an internal diameter of the leakage checking line is smaller than an internal diameter of the fluid line.

An aspect of the present disclosure provides a polishing apparatus including: a polishing table that supports a polishing pad; a polishing head that presses a substrate to a surface of the polishing pad to polish the substrate; a heat exchanger that is disposed on the polishing pad; and a leakage checking system that checks a leakage of fluid that flows in a fluid line in which a supply valve and a return valve are disposed. The heat exchanger is disposed in the fluid line, and the leakage checking system includes an intermediate valve that is disposed in the fluid line between the supply valve and the return valve, a leakage checking line that is connected to the fluid line to bypass the intermediate valve, an opening/closing valve and a flowmeter that are disposed in the leakage checking line, and a controller that is connected to the intermediate valve, the opening/closing valve, and the flowmeter. The controller closes the intermediate valve and the return valve and opens the opening/closing valve and the supply valve, acquires a flow rate of the fluid that flows in the leakage checking line by the flowmeter, compares the acquired flow rate of the fluid with a predetermined threshold, and determines that the fluid of the fluid line is leaked, when the acquired flow rate of the fluid is larger than the threshold.

In an aspect of the present disclosure, each time a substrate is polished by being pressed to a surface of the polishing pad while a surface temperature of the polishing pad is regulated by supplying the fluid that flows in the fluid line to the heat exchanger, the controller closes the intermediate valve and the return valve and opens the opening/closing valve and the supply valve, acquires a flow rate of the fluid that flows in the leakage checking line by the flowmeter, compares the acquired flow rate of the fluid with a predetermined threshold, and determines that the fluid of the fluid line is leaked, when the acquired flow rate of the fluid is larger than the predetermined threshold.

In an aspect of the present disclosure, an internal diameter of the leakage checking line is smaller than an internal diameter of the fluid line.

According to the present disclosure, the pressure of the fluid that flows in the leakage checking line is the same as the pressure of the fluid of the fluid line. Accordingly, a measurement value of the flowmeter that is disposed in the leakage checking line and used to check the leakage of the fluid from the fluid line is hardly hunted. As a result, since the comparison between the flow rate of the fluid measured by the flowmeter and the threshold may be quickly started, the leakage of the fluid may be checked in short time.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, embodiments of the present disclosure will be described with reference to the drawings.

Figure 1:
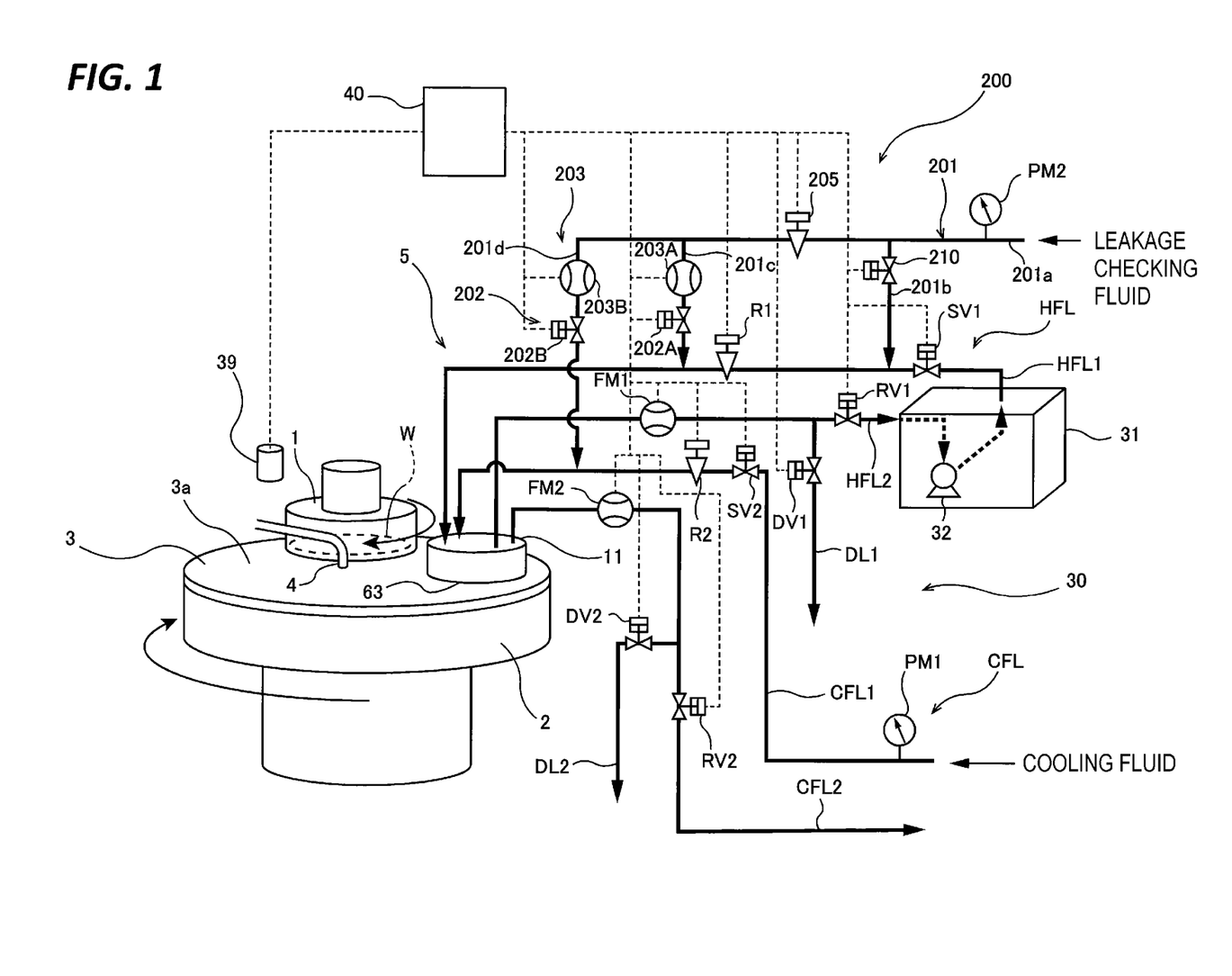
FIG. 1 is a schematic view illustrating an embodiment of a polishing apparatus.

FIG. 1 is a schematic view illustrating an embodiment of a polishing apparatus. As illustrated in FIG. 1, the polishing apparatus includes a polishing head 1 that holds and rotates a wafer W as an example of a substrate, a polishing table 2 that supports a polishing pad 3, a polishing liquid supply nozzle 4 that supplies a polishing liquid (e.g., slurry) to the surface of the polishing pad 3, and a pad temperature regulation system 5 that regulates the surface temperature of the polishing pad 3. The (upper) surface 3a of the polishing pad 3 constitutes the polishing surface for polishing the wafer W.

The polishing head 1 is vertically movable, and rotatable about the axis thereof in the direction indicated by the arrow. The wafer W is held to the lower surface of the polishing head 1 by a vacuum adsorption or the like. A motor (not illustrated) is connected to the polishing table 2, and is rotatable in the direction indicated by the arrow. As illustrated in FIG. 1, the polishing head 1 and the polishing table 2 are rotated in the same direction. The polishing pad 3 is attached to the upper surface of the polishing table 2.

The polishing of the wafer W is performed as follows. The wafer W to be polished is held by the polishing head 1 and also rotated by the polishing head 1. The polishing pad 3 is rotated along with the polishing table 2. A polishing liquid is supplied to the surface 3a of the polishing pad 3 from the polishing liquid supply nozzle 4, and the surface of the wafer W is pressed to the upper surface 3a of the polishing pad 3, that is, the polishing surface, by the polishing head 1. The surface of the wafer W is polished by being brought into a sliding contact with the polishing pad 3 under the presence of the polishing liquid. The surface of the wafer W is flattened by the chemical action of the polishing liquid and the mechanical action of abrasive grains contained in the polishing liquid.

The pad temperature regulation system 5 includes a heat exchanger 11 provided with therein flow paths in which fluids for regulating the surface temperature of the polishing pad 3 flow, and a fluid supply system 30 that supplies temperature-regulated heating fluid and temperature-regulated cooling fluid to the heat exchanger 11. The heat exchanger 11 has a pad contact surface 63 that may be in contact with the surface 3a of the polishing pad 3. The heat exchanger 11 is disposed above the polishing table 2, and placed on the surface 3a of the polishing pad 3.

The fluid supply system 30 includes a heating fluid supply tank 31 as a heating fluid supply source that stores the temperature-regulated heating fluid, and a heating fluid line HFL in which the heat exchanger 11 is disposed. The heating fluid line HFL includes a heating fluid supply line HFL1 and a heating fluid return line HFL2 that connect the heating fluid supply tank 31 and the heat exchanger 11 to each other. One-side ends of the heating fluid supply line HFL1 and the heating fluid return line HFL2 are connected to the heating fluid supply tank 31, and the other-side ends thereof are connected to the heat exchanger 11.

A pump 32 is disposed in the heating fluid supply tank 31 to circulate the heating fluid between the heating fluid supply tank 31 and the heat exchanger 11. When the pump 32 is driven, the temperature-regulated heating fluid is supplied from the heating fluid supply tank 31 to the heat exchanger 11 through the heating fluid supply line HFL1, flows in the heat exchanger 11, and then, is returned from the heat exchanger 11 to the heating fluid supply tank 31 through the heating fluid return line HFL2. In this way, the heating fluid is circulated between the heating fluid supply tank 31 and the heat exchanger 11. The heating fluid supply tank 31 includes a heater (not illustrated), and the heating fluid is heated by the heater to a predetermined temperature (e.g., 80° C.).

A first supply valve SV1 and a first pressure regulator R1 are disposed in the heating fluid supply line HFL1. The first supply valve SV1 is disposed on the upstream side of the heat exchanger 11, and the first pressure regulator R1 is disposed between the heat exchanger 11 and the first supply valve SV1. The first pressure regulator R1 is a pressure regulating device that regulates the pressure of fluid flowing in the heating fluid supply line HFL1. An example of the first pressure regulator R1 may be an electropneumatic regulator.

The first supply valve SV1 opens/closes the flow path of the heating fluid supply line HFL1, and is disposed adjacent to the heating fluid supply tank 31. The first supply valve SV1 is disposed on the upstream side (primary side) of the first pressure regulator R1 in the flow direction of the fluid that flows in the heating fluid supply line HFL1.

In the heating fluid return line HFL2, a first return valve RV1 is disposed to open/close the flow path of the heating fluid return line HFL2, and a first flowmeter FM1 is disposed to measure a flow rate of fluid that flows in the heating fluid return line HFL2. The first flowmeter FM1 is disposed on the upstream side (primary side) of the first return valve RV1 in the flow direction of the fluid that flows in the heating fluid return line HFL2. The first return valve RV1 is disposed adjacent to the heating fluid supply tank 31. In an embodiment, the first flowmeter FM1 may have a flow rate regulating function. This flowmeter is, for example, a mass-flow controller.

A first drain line DL1 is connected to the heating fluid return line HFL2 to discharge the fluid that flows in the heating flow return line HFL2 to the outside. The first drain line DL1 is disposed between the first flowmeter FM1 and the first return valve RV1, and a first drain valve DV1 is connected to the first drain line DL1 to open/close the flow path of the first drain line DL1. The first drain valve DV1 is usually closed.

The fluid supply system 30 further includes a cooling fluid line CFL in which the heat exchanger 11 is disposed. Accordingly, the fluid supply system 30 of the polishing apparatus according to the present embodiment includes the plurality of fluid lines (i.e., the heating fluid line HFL and the cooling fluid line CFL). In an embodiment, the fluid supply system 30 may include any one of the heating fluid line HFL and the cooling fluid line CFL, or may include one or a plurality of fluid lines which are different from the heating fluid line HFL and the cooling fluid line CFL. That is, the fluid supply system 30 may include at least one fluid line.

The cooling fluid line CFL includes a cooling fluid supply line CFL1 and a cooling fluid return line CFL2 that are connected to the heat exchanger 11. The cooling fluid supply line CFL1 is connected to a cooling fluid supply source (e.g., a cold water supply source) provided in a plant where the polishing apparatus is disposed. The cooling fluid is supplied to the heat exchanger 11 through the cooling fluid supply line CFL1, flows in the heat exchanger 11, and then, is discharged from the heat exchanger 11 through the cooling fluid return line CFL2. In an embodiment, the cooling fluid that has flowed in the heat exchanger 11 may be returned to the cooling fluid supply source through the cooling fluid return line CFL2.

A second supply valve SV2 and a second pressure regulator R2 are disposed in the cooling fluid supply line CFL1. The second supply valve SV2 is disposed on the upstream side of the heat exchanger 11, and the second pressure regulator R2 is disposed between the heat exchanger 11 and the second supply valve SV2. The second supply valve SV2 opens/closes the flow path of the cooling fluid supply line CFL1, and the second pressure regulator R2 is a pressure regulating device that regulates the pressure of fluid flowing in the cooling fluid supply line CFL1. An example of the second pressure regulator R2 may be an electropneumatic regulator.

The second supply valve SV2 is disposed on the upstream side (primary side) of the second pressure regulator R2 in the flow direction of the fluid that flows in the cooling fluid supply line CFL1. A pressure gauge PM1 is disposed in the cooling fluid supply line CFL1 to measure the pressure of the fluid that flows in the flow path of the cooling fluid supply line CFL1, and the pressure gauge PM1 is disposed on the upstream side of the second supply valve SV2. In an embodiment, a pressure gauge may also be provided on the upstream side of the first supply valve SV1 in the heating fluid supply line HFL1.

In the cooling fluid return line CFL2, a second return valve RV2 is disposed to open/close the flow path of the cooling fluid return line CFL2, and a second flowmeter FM2 is disposed to measure a flow rate of the fluid that flows in the cooling fluid return line CFL2. The second flowmeter FM2 is disposed on the upstream side of the second return valve RV2 in the flow direction of the fluid that flows in the cooling fluid return line CFL2. In an embodiment, the second flowmeter FM2 may have the flow rate regulating function. This flowmeter is, for example, a mass-flow controller.

A second drain line DL2 is connected to the cooling fluid return line CFL2 to discharge the fluid that flows in the flow path of the cooling flow return line CFL2 to the outside. The second drain line DL2 is disposed between the second flowmeter FM2 and the second return valve RV2, and a second drain valve DV2 is connected to the second drain line DL2 to open/close the flow path of the second drain line DL2. The second drain valve DV2 is usually closed.

The pad temperature regulation system 5 further includes a pad temperature measuring device 39 that measures the surface temperature of the polishing pad 3 (hereinafter, referred to as a "pad surface temperature"). The pad temperature measuring device 39 is disposed above the surface 3a of the polishing pad 3, and configured to measure the surface temperature of the polishing pad 3 in a non-contact manner. The pad temperature measuring device 39 is connected to a controller 40, and the controller 40 controls the operations of the first pressure regulator R1 and the second pressure regulator R2 based on the pad surface temperature measured by the pad temperature measuring device 39. The detailed configuration of the controller 40 will be described later.

The controller 40 is configured to determine an operation amount of the first pressure regulator R1 and an operation amount of the second pressure regulator R2 which are necessary to eliminate a difference between a preset target temperature and the surface temperature of the polishing pad 3. The operation amount of the first pressure regulator R1 and the operation amount of the second pressure regulator R2 are transmitted to the first pressure regulator R1 and the second pressure regulator R2, respectively.

In other words, each of the operation amount of the first pressure regulator R1 and the operation amount of the second pressure regulator R2 is a valve opening degree. When the controller 40 regulates the valve opening degree of the first pressure regulator R1, the pressure of the heating fluid that flows in the heating fluid supply line HFL1 is changed, and as a result, the flow rate of the heating fluid that flows in the heating fluid line HFL on the downstream side of the first pressure regulator R1 is changed. When the first flowmeter FM1 is a flowmeter having the flow rate regulating function such as a mass-flow controller, the controller 40 may control the operation of the first flowmeter FM1 to control the flow rate of the heating fluid that flows in the heating fluid line HFL.

Similarly, when the controller 40 regulates the valve opening degree of the second pressure regulator R2, the pressure of the cooling fluid that flows in the cooling fluid supply line CFL2 is changed, and as a result, the flow rate of the cooling fluid that flows in the cooling fluid line CFL on the downstream side of the second pressure regulator R2 is changed. When the second flowmeter FM2 is a flowmeter having the flow rate regulating function such as a mass-flow controller, the controller 40 may control the operation of the second flowmeter FM2 to control the flow rate of the cooling fluid that flows in the cooling fluid line CFL.

The heating fluid line HFL and the cooling fluid line CFL are completely independent from each other. Accordingly, the heating fluid and the cooling fluid are supplied to the heat exchanger 11 and discharged from the heat exchanger 11, without being mixed with each other.

Figure 2:
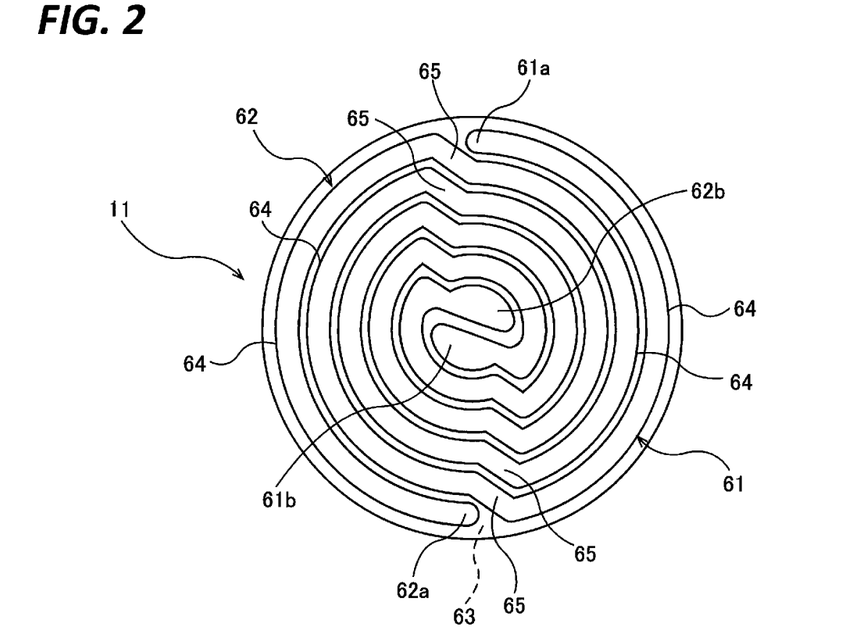
FIG. 2 is a horizontal cross-sectional view illustrating an embodiment of a heat exchanger.

Subsequently, an example of the heat exchanger 11 will be described. FIG. 2 is a horizontal cross-sectional view illustrating an embodiment of the heat exchanger 11. The heat exchanger 11 is a pad contact member provided with a heating flow path 61 and a cooling flow path 62 therein. The heat exchanger 11 includes the heating flow path 61 in which the heating fluid flows, the cooling flow path 62 in which the cooling fluid flows, and a pad contact surface 63 that may be in contact with the surface 3a of the polishing pad 3. In the present embodiment, the pad contact surface 63 has a circular shape. In an embodiment, the pad contact surface 63 may have a polygonal shape such as a square or pentagon. The material for forming the heating flow path 61, the cooling flow path 62, and the pad contact surface 63 may be a material having an excellent heat conductivity, abrasion resistance, and corrosion resistance such as SiC or alumina.

The heating flow path 61 and the cooling flow path 62 extend adjacent to each other, and extend in a spiral form. Further, the heating flow path 61 and the cooling flow path 62 have shapes point-symmetrical with each other and have the same length. Since the heating flow path 61 and the cooling flow path 62 are completely separated from each other, the heating fluid and the cooling fluid are not mixed with each other in the heat exchanger 11.

As illustrated in FIG. 2, each of the heating flow path 61 and the cooling flow path 62 is basically configured to include a plurality of arc flow paths 64 having constant curvatures, and a plurality of inclined flow paths 65 that connect the arc flow paths 64 to each other. Two adjacent arc flow paths 64 are connected to each other by each inclined flow path 65. According to this configuration, the outermost periphery of each of the heating flow path 61 and the cooling flow path 62 may be disposed at the outermost periphery of the heat exchanger 11. That is, the substantially entire pad contact surface 63 that is configured by the lower surface of the heat exchanger 11 is disposed below the heating flow path 61 and the cooling flow path 62, and thus, the heating liquid and the cooling liquid may quickly heat and cool the surface 3a of the polishing pad 3.

Figure 3:
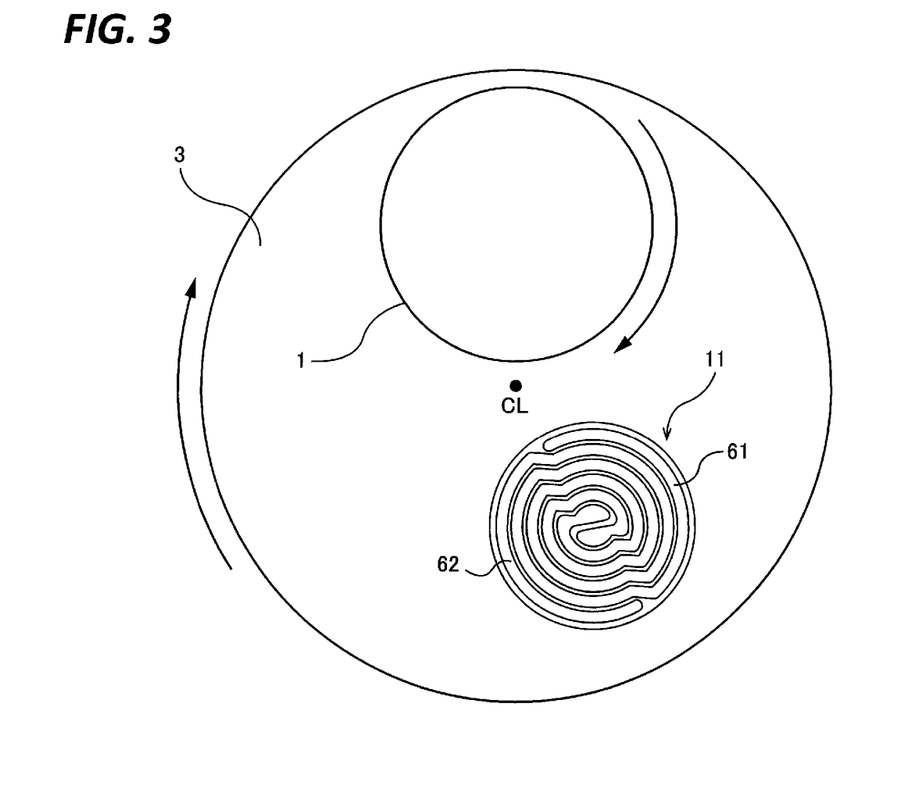
FIG. 3 is a plan view illustrating a positional relationship of the heat exchanger and a polishing head on a polishing pad.

FIG. 3 is a plan view illustrating a positional relationship of the heat exchanger 11 and the polishing head 1 on the polishing pad 3. The heat exchanger 11 has a circular shape when viewed from above, and the diameter of the heat exchanger 11 is smaller than that of the polishing head 1. The distance from the center CL of the polishing pad 3 to the center of the heat exchanger 11 is the same as the distance from the center CL of the polishing pad 3 to the center of the polishing head 1. Since the heating flow path 61 and the cooling flow path 62 are adjacent to each other, the heating flow path 61 and the cooling flow path 62 are arranged along the circumferential direction of the polishing pad 3. While the polishing table 2 and the polishing pad 3 are being rotated, the polishing pad 3 in contact with the heat exchanger 11 performs a heat exchange with the heating fluid and the cooling fluid.

Both the heating flow path 61 and the cooling flow path 62 are arranged above the entire pad contact surface 63. According to this arrangement, the heat exchanger 11 may control the surface temperature of the polishing pad 3 by both the heating fluid and the cooling fluid, in the entire pad contact surface 63. Accordingly, the heat exchanger 11 may form a uniform distribution of the surface temperature of the polishing pad 3. Further, the polishing apparatus provided with the heat exchanger 11 may polish a substrate such as a wafer so as to form a uniformed polishing profile.

In order to keep the pad surface temperature at a predetermined target temperature, the heat exchanger 11 is brought into contact with the surface (i.e., the polishing surface 3a) of the polishing pad 3 during the polishing of the wafer W. In the descriptions herein, the aspect where the heat exchanger 11 is brought into contact with the surface of the polishing pad 3 includes an aspect where the heat exchanger 11 is brought into contact with the surface of the polishing pad 3 in a state where a polishing liquid (slurry) exists between the heat exchanger 11 and the surface of the polishing pad 3, as well as an aspect where the heat exchanger 11 is brought into direct contact with the surface of the polishing pad 3. In any aspect, a heat exchange is performed between the heating fluid/the cooling fluid that flow in the heat exchanger 11 and the polishing pad 3 so that the pad surface temperature is controlled.

Figure 4:
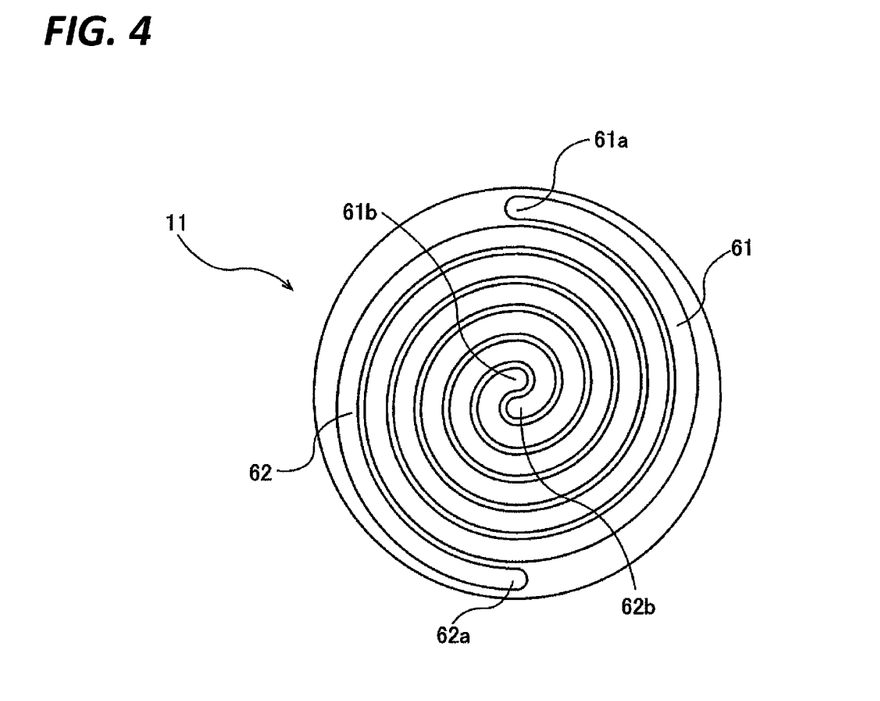
FIG. 4 is a horizontal cross-sectional view illustrating an embodiment of the heat exchanger.

FIG. 4 is a horizontal cross-sectional view illustrating another embodiment of the heat exchanger 11. As illustrated in FIG. 4, the heat exchanger 11 is provided with the heating flow path 61 and the cooling flow path 62 therein. The heat flow path 61 and the cooling flow path 62 extend adjacent to each other (side by side), and extend in the spiral form. Further, the heating flow path 61 and the cooling flow path 62 have shapes point-symmetrical with each other and have the same length.

The heating fluid supply line HFL1 is connected to an inlet 61a of the heating flow path 61, and the heating fluid return line HFL2 is connected to an outlet 61b of the heating flow path 61. The cooling fluid supply line CFL1 is connected to an inlet 62a of the cooling flow path 62, and the cooling fluid return line CFL2 is connected to an outlet 62b of the cooling flow path 62. The inlets 61a and 62a of the heating flow path 61 and the cooling flow path 62 are positioned at the periphery of the heat exchanger 11, and the outlets 61a and 61b of the heating flow path 61 and the cooling flow path 62 are positioned at the center of the heat exchanger 11. Accordingly, the heating liquid and the cooling liquid flow in the spiral form from the periphery of the heat exchanger 11 toward the center of the heat exchanger 11. Since the heating flow path 61 and the cooling flow path 62 are completely separated from each other, the heating fluid and the cooling fluid are not mixed with each other in the heat exchanger 11.

The fluid that flows in the heating fluid line HFL including the heat exchanger 11 may be leaked from the heating fluid line HFL due to, for example, a damage to the heating fluid line HFL (e.g., a damage to the heat exchanger 11). Similarly, the fluid that flows in the cooling fluid line CFL including the heat exchanger 11 may be leaked from the cooling fluid line CFL due to, for example, a damage to the cooling fluid line CFL. When the wafer W is polished in a state where the heating fluid and/or the cooling fluid leaked from the heating fluid line HFL and/or the cooling fluid line CFL is attached to the surface 3a of the polishing pad 3, a deterioration of the polishing rate of the wafer W and/or contaminants of the wafer W may occur.

Thus, as illustrated in FIG. 1, the polishing apparatus includes a fluid leakage checking system 200 for detecting a leakage of fluid from the heating fluid line HFL and the cooling fluid line CFL.

In the present embodiment, the fluid leakage checking system 200 is configured to detect a leakage of fluid from the heating fluid line HFL that extends from the first supply valve SV1 to the first return valve RV1, and a leakage of fluid from the cooling fluid line CFL that extends from the second supply valve SV2 to the second return valve RV2. Since the heat exchanger 11 is disposed in the heating fluid line HFL between the first supply valve SV1 and the first return valve RV1, the fluid leakage checking system 200 is able to detect a leakage of the heating fluid from the heat exchanger 11. Similarly, since the heat exchanger 11 is disposed in the cooling fluid line CFL between the second supply valve SV2 and the second return valve RV2, the fluid leakage checking system 200 is able to detect a leakage of the cooling fluid from the heat exchanger 11.

The fluid leakage checking system 200 includes a leakage checking line 201 that is connected to a fluid supply source (not illustrated) in which fluid for checking a leakage of fluid is stored. The fluid to be supplied from the fluid supply source to the leakage checking line 201 is, for example, deionized water. The leakage checking line 201 includes a main line 201a that extends from the fluid supply source, a first connection line 201b and a second connection line 201c that are branched from the main line 201a and connected to the heating fluid supply line HFL1, and a third connection line 201d that is branched from the main line 201a and connected to the cooling fluid supply line CFL1.

In the main line 201a, a pressure gauge PM2 is disposed to measure a pressure of fluid that flows in the flow path of the main line 201a, and a third pressure regulator 205 is disposed as a pressure regulating device that is able to regulate the pressure of the fluid that flows in the main line 201a. An example of the third pressure regulator 205 may be an electropneumatic regulator. The third pressure regulator 205 is connected to the controller 40, and the controller 40 controls the operation of the third pressure regulator 205 to control the pressure of the fluid that flows in the main line 201a.

The first connection line 201b is branched from the main line 201a between the pressure gauge PM2 and the third pressure regulator 205, and is connected to the heating fluid supply line HFL1 between the first supply valve SV1 and the first pressure regulator R1.

The second connection line 201c is branched from the main line 201a on the downstream side (secondary side) of the third pressure regulator 205 disposed in the main line 21a, and is connected to the heating fluid supply line HFL1 on the downstream side (secondary side) of the first pressure regulator R1 disposed in the heating fluid supply line HFL1.

The third connection line 201d is branched from the main line 201a on the downstream side of the branch point of the second connection line 201c, and is connected to the cooling fluid supply line CFL1 on the downstream side of the second pressure regulator R2 disposed in the cooling fluid supply line CFL1.

The fluid leakage checking system 200 further includes a first opening/closing valve 202A and a third flowmeter 203A that are disposed in the second connection line 201c, and the first opening/closing valve 202A and the third flowmeter 203A are connected to the controller 40 described above. The third flowmeter 203A is disposed on the upstream side (primary side) of the first opening/closing valve 202A. The third flowmeter 203A measures a flow rate of fluid that flows in the second connection line 201c, and transmits the measurement value to the controller 40. The pressure of the fluid introduced into the second connection line 201c from the main line 201a may be regulated by the third pressure regulator 205. The controller 40 controls the operation of the third pressure regulator 205 to supply fluid regulated to have a desired pressure to the heating fluid line HFL through the second connection line 201c.

The fluid leakage checking system 200 further includes a second opening/closing valve 202B and a fourth flowmeter 203B that are disposed in the third connection line 201d, and the second opening/closing valve 202B and the fourth flowmeter 203B are connected to the controller 40 described above. The fourth flowmeter 203B is disposed on the upstream side (primary side) of the second opening/closing valve 202B. The fourth flowmeter 203B measures a flow rate of fluid that flows in the third connection line 201d, and transmits the measurement value to the controller 40. The pressure of the fluid introduced into the third connection line 201d from the main line 201a may be regulated by the third pressure regulator 205. The controller 40 controls the operation of the third pressure regulator 205 to supply fluid regulated to have a desired pressure to the cooling fluid line CFL through the third connection line 201d.

In addition, the controller 40 is also connected to the first supply valve SV1, the second supply valve SV2, the first return valve RV1, the second return valve RV2, the first drain valve DV1, the second drain valve DV2, the first pressure regulator R1, the second pressure regulator R2, the first flowmeter FM1, and the second flowmeter FM2.

It is desirable that the internal diameters of the second connection line 201c and the third connection line 201d are smaller than the internal diameters of the heating fluid line HFL and the cooling fluid line CFL. As described later, the flow rate of the fluid that flows in each of the second connection line 201c and the third connection line 201d corresponds to a leakage amount of micro fluid leaked from each of the heating fluid line HFL and the cooling fluid line CFL. Thus, the internal diameters of the second connection line 201c and the third connection line 201d are made small, such that the velocity of the fluid that flows in each of the second connection line 201c and the third connection line 201d is increased. As a result, the third flowmeter 203A and the fourth flowmeter 203B may detect the flow rate of the fluid that flows in each of the second connection line 201c and the third connection line 201d, with high accuracy.

A third opening/closing valve 210 is disposed in the first connection line 201b to open/close the flow path of the first connection line 201b. Since the controller 40 is also connected to the third opening/closing valve 210, the controller 40 is configured to be able to control the opening/closing operation of the third opening/closing valve 210.

The first connection line 201b is a fluid line that supplies fluid from the leakage checking line 201 to the heating fluid line HFL, in order to decrease the temperature of the heating fluid line HFL. As described above, since the heating fluid is supplied to the heat exchanger 11 when the wafer W is polished in the polishing apparatus, the temperature of the heating fluid line HFL increases. Accordingly, in a case where a worker contacts the heating fluid line HFL that remains at the high temperature to perform the maintenance of the polishing apparatus, the worker may be burned. Thus, in order to safely perform the maintenance of the polishing apparatus, the controller 40 opens the third supply valve 210 to supply fluid to the heating fluid line HFL through the first connection line 201b. At this time, the controller 40 closes the first supply valve SV1 and the first return valve RV1, and opens the first drain valve DV1. As a result, since the heating fluid of the heating fluid line HFL is substituted with the low-temperature fluid that flows in the leakage checking line 201, the temperature of the heating fluid line HFL may be quickly decreased.

In the present embodiment, the controller 40 is configured to perform an operation to check a leakage of the fluid of the heating fluid line HFL (first checking operation) and an operation to check a leakage of the fluid of the cooling fluid line CFL (second checking operation). The controller 40 performs the first checking operation and the second checking operation separately from each other. Since the second checking operation that is performed by the controller 40 is similar to the first checking operation, the first checking operation is described below.

Figure 5:
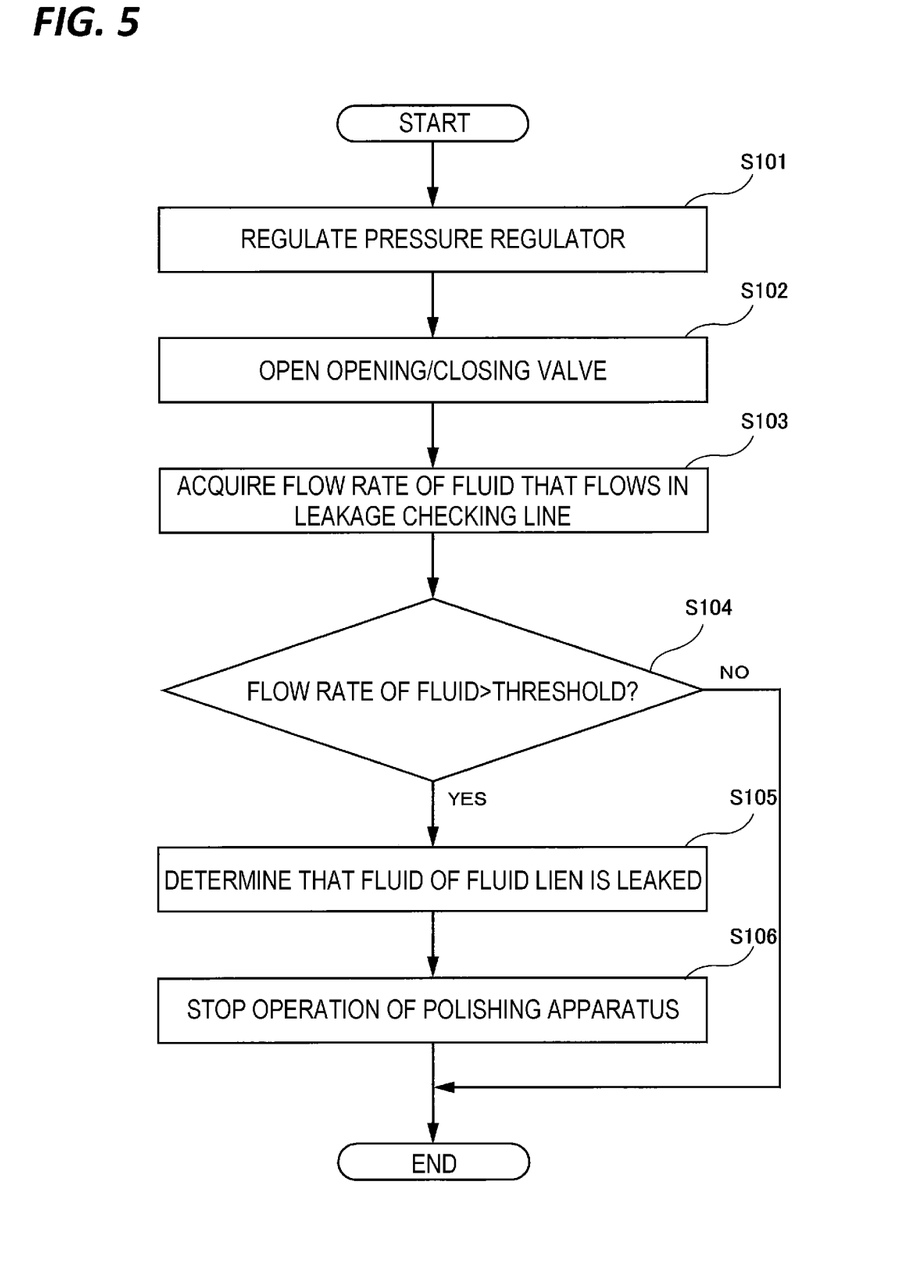
FIG. 5 is a flowchart illustrating a fluid leakage checking operation.
Figure 6:
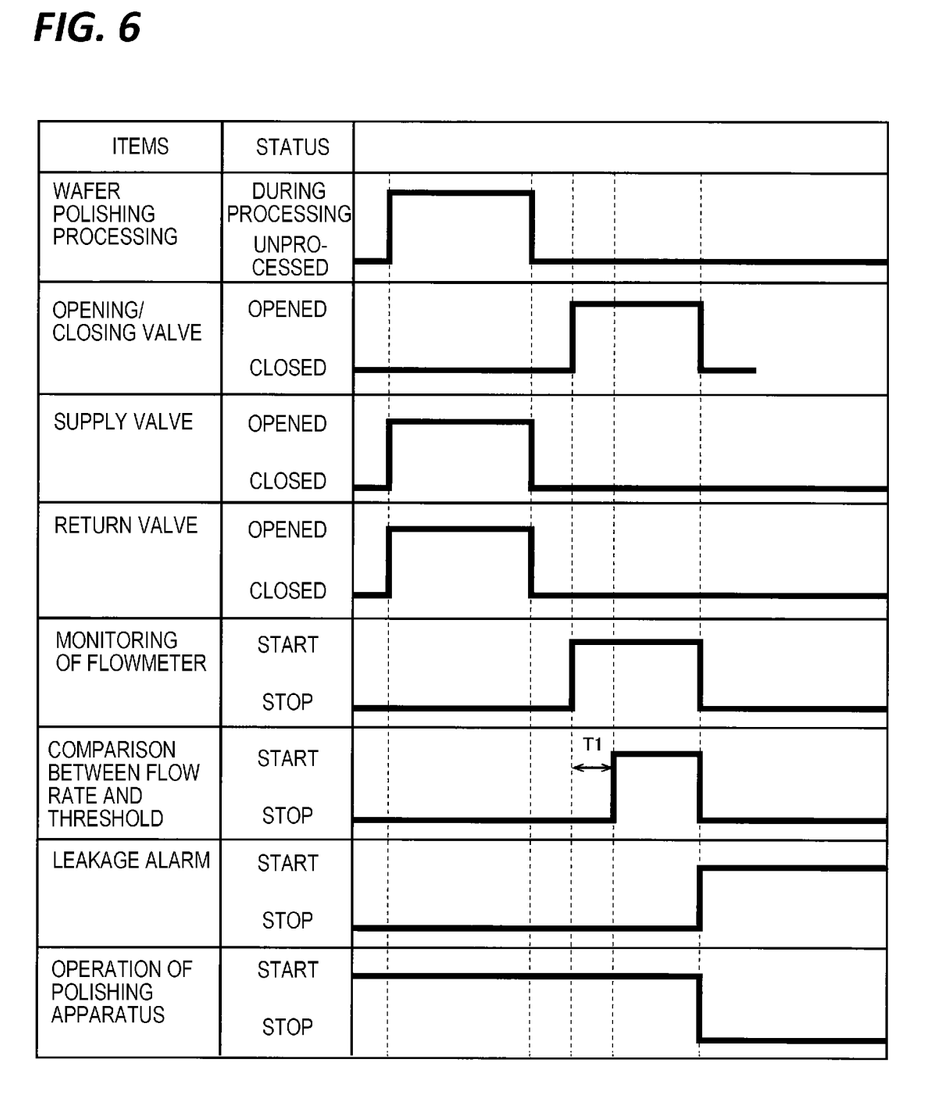
FIG. 6 is a view illustrating an operation of the polishing apparatus which is controlled by a controller.

FIG. 5 is a flowchart illustrating the fluid leakage checking operation. FIG. 6 is a view illustrating the operation of the polishing apparatus which is controlled by the controller 40. As illustrated in FIG. 6, while regulating the surface temperature of the polishing pad 3 by supplying the heating fluid that flows in the heating fluid line HFL and the cooling fluid that flows in the cooling fluid line CFL to the heat exchanger 11, the polishing apparatus polishes the wafer W by pressing the wafer W to the surface 3*a* of the polishing pad 3 (polishing processing). In FIG. 6, "during processing" indicates a state where the polishing head 1 holds the wafer W, and "unprocessed" indicates a state where the polishing head 1 does not hold the wafer W. During the processing of the wafer W, the opening/closing valves 202A and 202B are closed, and the supply valves SV1 and SV2 and the return valves RV1 and RV2 are opened.

The first checking operation is performed in a state where the polishing processing is the unprocessed state. Specifically, the controller 40 causes the wafer W to leave from the polishing head 1, and closes the supply valves SV1 and SV2 and the return valves RV1 and RV2 (see FIG. 6). In this state, the controller 40 starts the first checking operation. In addition, during the first checking operation, the operation of the pump 32 (see FIG. 1) may be continued or stopped. Since a loop line (not illustrated) is connected to the pump 32 to suppress a shutoff operation, the pump 32 is not in a shutoff state even when the first supply valve SV1 and the first return valve RV1 are closed.

As illustrated in FIG. 5, the controller 40 regulates the third pressure regulator 205 such that the pressure of the fluid of the second connection line 201*c* becomes the same as the pressure of the fluid of the heating fluid line HFL (see step S101). The first pressure regulator R1 disposed in the heating fluid line HFL transmits the pressure of the heating fluid that flows in the heating fluid line HFL to the controller 40, and the controller 40 regulates the third pressure regulator 205 such that the pressure of the fluid of the second connection line 201*c* becomes the same as the received pressure of the heating fluid.

Subsequently, the controller 40 opens the first opening/closing valve 202A (see step S102). Simultaneously with the opening of the first opening/closing valve 202A, the controller 40 acquires a measurement value of the flow rate measured by the third flowmeter 203A (see step S103), and starts monitoring the flow rate of the fluid that flows in the second connection line 201*c*. In addition, the third flowmeter 203A disposed in the second connection line 201*c* has a higher measurement accuracy than the measurement accuracy of the first flowmeter FM1 disposed in the heating fluid supply line HFL1. It is desirable that the third flowmeter 203A is a micro-flowmeter that is able to detect a micro flow rate. When the flow rate of the heating fluid that usually flows in the heating fluid line HFL is about 6 l/min, the micro-flowmeter is able to measure the flow rate of the fluid in the range of, for example, 0.2 ml/min to 2.0 ml/min.

Subsequently, after an elapse of a predetermined time T1 from the start of the monitoring of the flow rate (hereinafter, "delay time T1"), the controller 40 starts comparing the acquired flow rate of the fluid with a predetermined threshold (see step S104). It is predicated that immediately after the first opening/closing valve 202A is opened, the measurement value of the flow rate measured by the third flowmeter 203A is to be hunted. Thus, since the controller 40 may not accurately perform the leakage detection, the delay time T1 during which the hunting becomes stable is provided. The controller 40 is configured to start the comparison between the acquired flow rate of the fluid and the predetermined threshold after the elapse of the delay time T1.

In the present embodiment, the pressure of the fluid of the second connection line 201*c* is regulated by the third pressure regulator 205 to become the same as the pressure of the fluid of the heating fluid line HFL. Accordingly, since the measurement value of the flow rate measured by the third flowmeter 203A is hardly hunted, the delay time T1 may be set to be as short as possible. As a result, the time necessary for the first checking operation may be reduced. The delay time T1 may be determined by, for example, an experiment, and the controller 40 stores the delay time T1 in advance.

In addition, when the fluid is being leaked from the heating fluid line HFL due to a damage to the heating fluid line HFL, supplying a high-pressure fluid to the heating fluid line HFL may expand the location of the damage. In the present embodiment, since the pressure of the fluid of the second connection line 201*c* is the same as the pressure of the fluid of the heating fluid line HFL, the location of the damage is suppressed from being expanded.

When the acquired flow rate is larger than the predetermined threshold (see "Yes" of step S104), the controller 40 determines that the fluid of the heating fluid line HFL is leaked (see step S105). In this case, the controller 40 makes a leakage alarm, and stops the operation of the polishing apparatus at the same time (see step S106). When the flow rate of the fluid is smaller than the predetermined threshold (see "No" of step S104), the controller 40 ends the first checking operation, and thereafter, the polishing apparatus starts polishing the next wafer.

In an embodiment, the controller 40 may determine that the fluid of the heating fluid line HFL is leaked, when the state where the flow rate of the fluid is larger than the predetermined threshold is continued for a predetermined time (e.g., 5 seconds). The predetermined time may be determined by, for example, an embodiment.

The second checking operation to check the leakage of the fluid from the cooling fluid line CFL is performed in the same manner as that of the first checking operation. That is, the controller 40 regulates the third pressure regulator 205 such that the pressure of the fluid of the third connection line 201*d* becomes the same as the pressure of the fluid of the cooling fluid line CFL (see step S101), and opens the second opening/closing valve 202B (see step S102). Then, the controller 40 acquires a measurement value of the flow rate measured by the fourth flow rate 203B (see step S103), and starts comparing the acquired flow rate of the fluid with a predetermined threshold, after the delay time T1 elapses from the start of the monitoring of the flow rate (see step S104). When the acquired flow rate is larger than the predetermined threshold (see "Yes" of step S104), the controller 40 determines that the fluid of the cooling fluid line CFL is leaked (see step S105), and stops the operation of the polishing apparatus (see step S106). When the flow rate of the fluid is smaller than the predetermined threshold (see "No" of step S104), the controller 40 ends the second checking operation, and thereafter, the polishing apparatus starts polishing the next wafer. In addition, it is desirable that the fourth flowmeter 203B is a micro-flowmeter that is able to detect a micro flow rate. When the flow rate of the cooling fluid that usually flows in the cooling fluid line CFL is about 6 l/min, the micro-flowmeter is able to measure the flow rate of the fluid in the range of, for example, 0.2 ml/min to 2.0 ml/min.

The controller 40 may consecutively perform the first checking operation and the second checking operation. When the pressure of the fluid of the heating fluid line HFL is the same as the pressure of the fluid of the cooling fluid line CFL, the controller 40 may perform the second checking operation simultaneously with the first checking operation.

As described above, in the present embodiment, the leakage of the fluid from the fluid line may be checked in short time. Accordingly, the above-described first checking operation and/or second checking operation may be performed each time the polishing apparatus polishes the wafer W. Since the first checking operation and the second checking operation may be performed in short time, the throughput of the polishing apparatus is hardly deteriorated even when the first checking operation and the second checking operation are performed each time the wafer W is polished.

Figure 7:
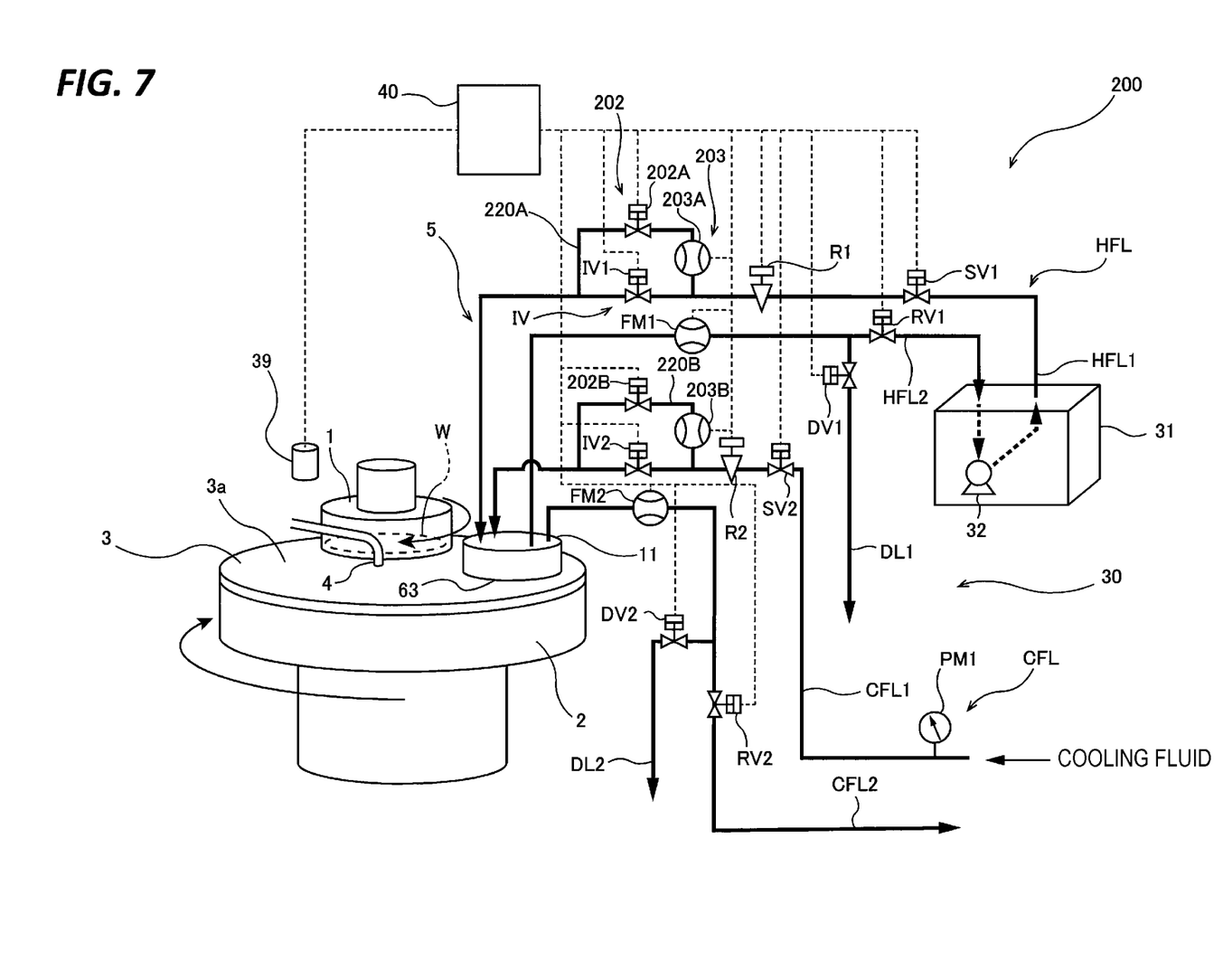
FIG. 7 is a schematic view illustrating another embodiment of the polishing apparatus.

FIG. 7 is a schematic view illustrating another embodiment of the polishing apparatus. Since the configuration and operations of the present embodiment which are not described hereinbelow are similar to those in the embodiment described above, overlapping descriptions thereof will be omitted.

In the present embodiment, the leakage checking system 200 includes a first intermediate valve IV1 that is disposed in the heating fluid line HFL between the first supply valve SV1 and the first return valve RV1. The first intermediate valve IV1 is connected to the controller 40, and disposed between the heat exchanger 11 and the first pressure regulator RE That is, the first intermediate valve IV1 is disposed on the downstream side of the first pressure regulator R1 and on the upstream side of the heat exchanger 11.

The leakage checking system 200 further includes a first leakage checking line 220A that is connected to the heating fluid line HFL to bypass the first intermediate valve IV1, and a first opening/closing valve 202A and a third flowmeter 203A that are disposed in the first leakage checking line 220A. The third flowmeter 203A is disposed on the upstream side (primary side) of the first opening/closing valve 202A. The third flowmeter 203A measures a flow rate of fluid that flows in the first leakage checking line 220A, and transmits the measurement value to the controller 40.

The leakage checking system 200 further includes a second intermediate valve IV2 that is disposed in the cooling fluid line CFL between the second supply valve SV2 and the second return valve RV2. The second intermediate valve IV2 is connected to the controller 40, and disposed between the heat exchanger 11 and the second pressure regulator R2. That is, the second intermediate valve IV2 is disposed on the downstream side of the second pressure regulator R2 and on the upstream side of the heat exchanger 11.

The leakage checking system 200 further includes a second leakage checking line 220B that is connected to the cooling fluid line CFL to bypass the second intermediate valve IV2, and a second opening/closing valve 202B and a fourth flowmeter 203B that are disposed in the second leakage checking line 220B. The fourth flowmeter 203B is disposed on the upstream side (primary side) of the second opening/closing valve 202B. The fourth flowmeter 203B measures a flow rate of fluid that flows in the second leakage checking line 220B, and transmits the measurement value to the controller 40.

In the embodiment illustrated in FIG. 7 as well, the controller 40 is configured to separately or simultaneously perform the first checking operation (i.e., the operation to check the leakage of the fluid from the heating fluid line HFL) and the second checking operation (i.e., the operation to check the leakage of the fluid from the cooling fluid line CFL). Since the first checking operation and the second checking operation are the same, the first checking operation that is performed by the controller 40 is described below.

First, the controller 40 closes the first intermediate valve IV1 and the first return valve RV1, and opens the first opening/closing valve 202A and the first supply valve SV1. In this case, the heating fluid of which pressure has been regulated by the first pressure regulator R1 is introduced into the first leakage checking line 220A. In addition, since a loop line (not illustrated) is connected to the pump 32 to suppress the shutoff operation of the pump 32, the pump 32 is not in the shutoff state even when the first return valve RV1 is closed.

Then, the controller 40 acquires the flow rate of the fluid that flows in the first checking line 220A as measured by the third flowmeter 203A, and compares the acquired flow rate of the fluid with a predetermined threshold. When the acquired flow rate of the fluid is larger than the threshold, the controller 40 determines that the fluid of the heating fluid line HFL is leaked.

The second checking operation is performed in the same manner as that of the first checking operation. That is, the controller 40 closes the second intermediate valve IV2 and the second return valve RV2, and opens the second opening/closing valve 202B and the supply valve SV1. In this case, the heating fluid of which pressure has been regulated by the second pressure regulator R2 is introduced into the second leakage checking line 220B.

Then, the controller 40 acquires the flow rate of the fluid that flows in the second leakage checking line 220B as measured by the fourth flowmeter 203B, and compares the acquired flow rate of the fluid with a predetermined threshold. When the acquired flow rate of the fluid is larger than the threshold, the controller 40 determines that the fluid of the cooling fluid line CFL is leaked.

In the embodiment illustrated in FIG. 7 as well, the same effect as that in the embodiment described above may be obtained. That is, the pressure of the fluid that flows in the first leakage checking line 220A is the same as the pressure of the fluid that flows in the heating fluid line HFL. Similarly, the pressure of the fluid that flows in the second leakage checking line 220B is the same as the pressure of the fluid that flows in the cooling fluid line CFL. Accordingly, since the delay time T1 (see FIG. 6) may be set to be as short as possible, the time necessary for the first checking operation and/or the second checking operation may be reduced.

Figure 8:
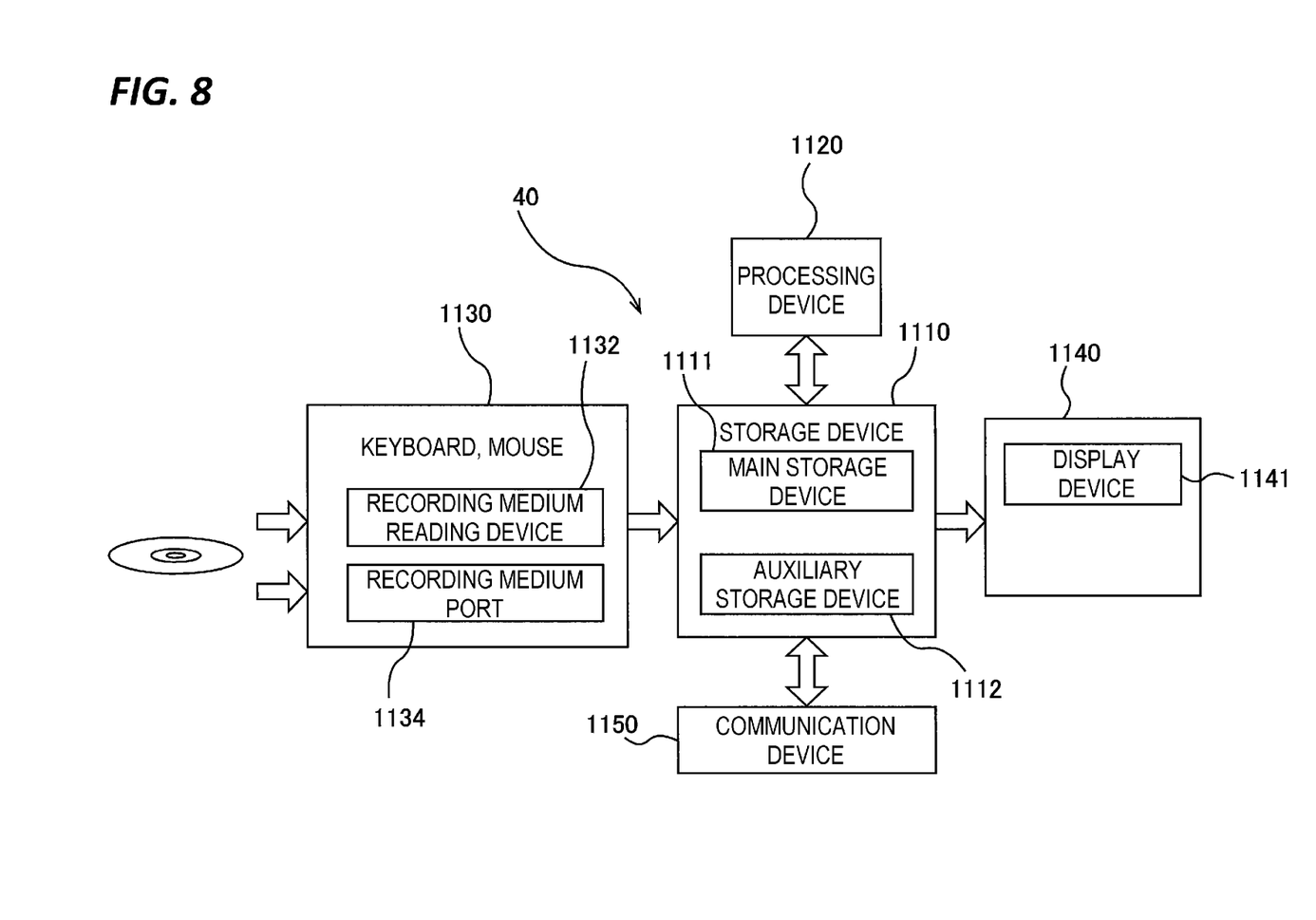
FIG. 8 is a schematic view illustrating an example of a configuration of the controller.

The controller 40 is configured by a dedicated or general computer. FIG. 8 is a schematic view illustrating an example of the configuration of the controller 40. As illustrated in FIG. 8, the controller 40 includes a storage device 1110 that stores programs, data or the like, a processing device 1120 such as a central processing unit (CPU) that performs an arithmetic operation according to the programs stored in the storage device 1110, an input device 1130 for inputting data, programs, and various pieces of information to the storage device 1110, an output device 1140a for outputting a processing result or processed data, and a communication device 1150 for a connection to a network such as the Internet.

The storage device 1110 includes a main storage device 1111 to which the processing device 1120 is accessible, and an auxiliary storage device 1112 that stores data and programs. The main storage device 1111 is, for example, a random access memory (RAM), and the auxiliary storage device 1112 is, for example, a hard disk drive HDD or a solid state drive SSD.

The input device 1130 includes a keyboard and a mouse, and further includes a recording medium reading device 1132 that reads data from a recording medium, and a recording medium port 1134 to which a recording medium is connected. The recording medium is a computer-readable recording medium which is a non-transitory tangible object and is, for example, an optical disk (e.g., a CD-ROM or a DVD-ROM) or a semiconductor memory (e.g., a USB flash drive or a memory card). An example of the recording medium reading device 1132 may be an optical drive such as a CD drive or a DVD drive, or a card reader. An example of the recording medium port 1134 may be a USB terminal. The programs and/or data electrically stored in the recording medium are introduced into the valve controller 40 via the input device 1130, and stored in the auxiliary storage device 1112 of the storage device 1110. The output device 1140 includes a display device 1141.

The controller 40 performs the fluid leakage checking operations (the first checking operation and the second checking operation) according to the programs electrically stored in the storage device 1110. That is, the controller 40 regulates the third pressure regulator 205 such that the pressure of the fluid of the first leakage checking line 201A (or the second leakage checking line 201B) becomes the same as the pressure of the fluid of the heating fluid line HFL (or the cooling fluid line CFL). Further, the controller 40 closes the first supply valve SV1 and the first return valve RV1 (or the second supply valve SV2 and the second return valve RV2) and opens the first opening/closing valve 202A (or the second opening/closing valve 202B), to acquire the flow rate of the fluid that flows in the first leakage checking line 201A (or the second leakage checking line 201B) by the third flowmeter 203A (or the fourth flowmeter 203B). Then, the controller 40 compares the acquired flow rate of the fluid with a predetermined threshold, and determines that the fluid of the heating fluid line HFL (or the cooling fluid line CFL) is leaked, when the acquired flow rate of the fluid is larger than the threshold.

Alternatively, the controller 40 closes the first intermediate valve IV1 and the first return valve RV1 (or the second intermediate valve IV2 and the second return valve RV2) and opens the first opening/closing valve 202A and the first supply valve SV1 (or the second opening/closing valve 202B and the second supply valve SV2), to acquire the flow rate of the fluid that flows in the first leakage checking line 220A (or the second leakage checking line 220B) by the third flowmeter 203A (or the fourth flowmeter 203B). Then, the controller 40 compares the acquired flow rate of the fluid with a predetermined threshold, and determines that the fluid of the heating fluid line HFL (or the cooling fluid line CFL) is leaked, when the acquired flow rate of the fluid is larger than the threshold.

The programs for causing the controller 40 to perform the steps described above are recorded in a computer-readable recording medium which is a non-transitory tangible object, and are provided to the controller 40 via the recording medium. Alternatively, the programs may be provided to the controller 40 via a communication network such as the Internet.

In the embodiments described above, descriptions have been made on the method of checking the leakage of fluid from the heating fluid line HFL and the cooling fluid line CFL of the pad temperature regulation system 5. However, the present disclosure is not limited to the embodiments. The present disclosure may be applied to any general apparatus provided with a fluid line in which fluid flows, and a supply valve and a return valve which are disposed in the fluid line.

For example, the method of checking a leakage of fluid according to the embodiments described above may be used to check a leakage of oil from a fluid line in which oil to be supplied to a pressing machine flows. The oil to be supplied to the pressing machine is used for an actuator such as a hydraulic cylinder for moving a mold. In addition, the method of checking a leakage of fluid according to the embodiments described above may be used to check a leakage of a chiller coolant from a fluid line in which the coolant flows.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method of checking a leakage of fluid from a fluid line in which a supply valve and a return valve are disposed, the method comprising:
   connecting a leakage checking line to the fluid line between the supply valve and the return valve;
   regulating a pressure regulator disposed in the leakage checking line such that a pressure of fluid in the leakage checking line becomes the same as a pressure of fluid in the fluid line;
   closing the supply valve and the return valve, and opening an opening/closing valve disposed in the leakage checking line;
   acquiring a flow rate of the fluid that flows in the leakage checking line by a flowmeter disposed in the leakage checking line;
   comparing the flow rate of the fluid acquired at the acquiring with a predetermined threshold; and
   determining that the fluid of the fluid line is leaked, when the flow rate of the fluid acquired at the acquiring is larger than the predetermined threshold.

2. The method according to claim 1, wherein a heat exchanger is disposed in the fluid line,
   the supply valve is disposed on a primary side of the heat exchanger, and
   the return valve is disposed on a secondary side of the heat exchanger.

3. The method according to claim 2, wherein the heat exchanger is disposed on a polishing pad of a polishing apparatus,
   a substrate is polished by being pressed to a surface of the polishing pad while a surface temperature of the polishing pad is regulated by supplying the fluid that flows in the fluid line to the heat exchanger, and
   the regulating, the closing, the acquiring, the comparing, and the determining are repeated each time the substrate is polished.

4. The method according to claim 1, wherein an internal diameter of the leakage checking line is smaller than an internal diameter of the fluid line.

5. A method of checking a leakage of fluid that flows in a fluid line in which a supply valve and a return valve are disposed, the method comprising:
   disposing an intermediate valve in the fluid line between the supply valve and the return valve;
   connecting a leakage checking line to the fluid line such that the leakage checking line bypasses the intermediate valve;

closing the intermediate valve and the return valve, and opening an opening/closing valve disposed in the leakage checking line and the supply valve;
acquiring a flow rate of fluid that flows in the leakage checking line by a flowmeter disposed in the leakage checking line;
comparing the flow rate of the fluid acquired at the acquiring with a predetermined threshold; and
determining that the fluid of the fluid line is leaked, when the flow rate of the fluid acquired at the acquiring is larger than the predetermined threshold,
wherein a heat exchanger is disposed in the fluid line,
the supply valve and the intermediate valve are disposed on a primary side of the heat exchanger,
the return valve is disposed on a secondary side of the heat exchanger,
the heat exchanger is disposed on a polishing pad of a polishing apparatus,
a substrate is polished by being pressed to a surface of the polishing pad while a surface temperature of the polishing pad is regulated by supplying the fluid that flows in the fluid line to the heat exchanger, and
the closing, the acquiring, the comparing, and the determining are repeated each time the substrate is polished.

6. The method according to claim 5, wherein a regulator is disposed in the fluid line to regulate a pressure of the fluid that flows in the fluid line, and
the intermediate valve and the leakage checking line are disposed on a secondary side of the regulator.

7. The method according to claim 5, wherein an internal diameter of the leakage checking line is smaller than an internal diameter of the fluid line.

\* \* \* \* \*